United States Patent [19]

Iida et al.

[11] Patent Number: 5,321,785
[45] Date of Patent: Jun. 14, 1994

[54] OPTICAL FIBER ARRAY AND METHOD OF MAKING THE SAME

[75] Inventors: Masanori Iida, Neyagawa; Hiroyuki Asakura; Tetsuji Miwa, both of Osaka, all of Japan

[73] Assignee: Matsushita Electric Industrial Co., Ltd., Osaka, Japan

[21] Appl. No.: 13,722

[22] Filed: Feb. 3, 1993

[30] Foreign Application Priority Data

Feb. 4, 1992 [JP] Japan .................................. 4-018643
Feb. 14, 1992 [JP] Japan .................................. 4-027778

[51] Int. Cl.⁵ .............................................. G02B 6/04
[52] U.S. Cl. ...................................... 385/85; 385/80; 385/115; 385/147; 359/900
[58] Field of Search .................. 385/77, 37, 59, 63, 385/115, 116, 120, 85, 80, 57, 147; 359/900

[56] References Cited

U.S. PATENT DOCUMENTS

| 4,323,300 | 4/1982 | Stewart et al. | 385/59 |
| 4,763,969 | 8/1988 | Khoe et al. | 350/96.19 |
| 5,214,730 | 5/1993 | Nagasawa et al. | 385/59 |

FOREIGN PATENT DOCUMENTS

| 0176623 | 4/1986 | European Pat. Off. . |
| 0191432 | 8/1986 | European Pat. Off. . |
| 3216754 | 11/1983 | Fed. Rep. of Germany . |
| 3606682 | 6/1987 | Fed. Rep. of Germany . |
| 62-115403 | 5/1987 | Japan . |
| 63-186209 | 8/1988 | Japan .......................... 385/115 |

OTHER PUBLICATIONS

Lipson et al., "A Six-Channel Wavelength Multiplexer and Demultiplexer for Single Mode Systems", Journal of Lightwave Technology, vol. LT-3, No. 5, Oct. 1985, pp. 1159-1163.
Patent Abstracts of Japan, vol. 16, No. 89 (P-1320), Mar. 4, 1992.
Patent Abstracts of Japan, vol. 14, No. 111 (P-1014), Feb. 28, 1990.

Primary Examiner—Rodney B. Bovernick
Assistant Examiner—John Ngo
Attorney, Agent, or Firm—Wenderoth, Lind & Ponack

[57] ABSTRACT

An optical fiber array includes a pair of blocks having respective recesses which, when the blocks are combined together, cooperate together to define a cavity, and a plurality of optical fibers having respective end portions accommodated within the cavity in a linear array. Neighboring end faces of the blocks adjacent end faces of the optical fibers are ground at an inclination relative to a common plane in which the linear array of the end portions of the optical fibers lie and also relative to an optical axis of each of the optical fibers. A method of making the optical fiber array and a wavelength selecting device utilizing the optical fiber array are also disclosed.

9 Claims, 7 Drawing Sheets

OPTICAL FIBER ARRAY AND METHOD OF MAKING THE SAME

BACKGROUND OF THE INVENTION

1. Field of the Invention

The present invention relates a method of arranging the form of a linear array, a plurality of optical fibers of a kind generally used in optical fiber communication and information processing, a method of fixing the optical fibers in readiness for connection with a corresponding number of similar optical fibers, and a wavelength selecting device utilizing the optical fibers.

2. Description of the Prior Art

Requirements associated with the linear arrangement of optical fibers and the positioning accuracy thereof have now become severe and, at the same time, various attempts have been made to minimize problems brought about by rays of light reflected from end faces of the optical fibers connected with other optical elements. Although the problems brought about by the reflection of light from the end faces of the optical fibers may be substantially eliminated if the end face of each optical fibers is skewed, the optical fibers now in wide use have an end face lying perpendicular to the longitudinal axis thereof.

Hereinafter, one example of the prior art methods of making the conventional linear array of optical fibers referred to above will be discussed.

FIGS. 8(a) and 8(b) are schematic diagrams showing the sequence of manufacture of the conventional optical fiber array, and FIG. 9 is a schematic perspective view of the optical fiber array manufactured by the method shown in FIGS. 8(a) and 8(b). Referring to FIGS. 8 and 9, reference numerals 111 and 112 represent respective blocks; reference numerals 121 and 122 represent guide grooves defined in the associated blocks, respectively; and reference numeral 130 represents a plurality of optical fibers.

The optical fiber array is manufactured in the following manner.

The optical fibers 130 are received in the guide grooves 121 defined in the block 111 so as to be spaced an equal distance from each other as shown in FIG. 8(a). In order to fix the optical fibers 130 in position within the guide grooves 121, the block 112 having the guide grooves 122 defined therein in a pattern matching that of the guide grooves 121 in the block 111 is placed from above onto the block 111 as shown in FIG. 8(b). In this way, the optical fibers 130 are firmly clamped between the blocks 111 and 112.

While the optical fibers 130 are clamped between the blocks 111 and 112, end faces of those optical fibers 130 are ground to complete the optical fiber array as shown in FIG. 9. In this connection, see, for example, a paper by J. Lipson et al. entitled "A Six-channel Wavelength Multiplexer and Demultiplexer for Single Mode Systems" (IEEE Journal of Lightwave Technology, LT-3, No. 5, Page 1159, 1985).

However, the above-discussed prior art method has a problem in that a highly precise machining technique is required in forming the equally spaced guide grooves 121 or 122 in each of the blocks 111 and 112; also, the spacing between each of neighboring ones of guide grooves 121 or 122 is required to be small. Where the plural optical fibers 130 are required to be closely juxtaposed with the minimized spacing between neighboring optical fibers, a more precise positioning accuracy is required. In addition, when stresses are induced between the optical fibers 130 and end faces of the guide grooves 121 and 122 during the positioning of the optical fibers 130, breakage or damage tends to occur at such portions of the optical fibers where the stresses are induced.

Moreover, since the respective end faces of the optical fibers are perpendicular to the associated optical axes thereof, rays of light reflected from those end faces of the optical fibers bring about an adverse influence upon optical elements with which they are to be connected. Yet, even though the optical fibers having inclined end faces are made available, it has been difficult to arrange them at a precisely ground angle.

The prior art wavelength selecting device will now be discussed. The wavelength selecting device is a device for selecting a particular light from the multiplexed light beams used in a wavelength multiplexed optical communication system and, in recent years, various types of wavelength selecting devices have been suggested and examined. Specifically, a wavelength selecting method utilizing a diffraction grating is generally effective to accomplish a highly accurate wavelength selection at a broad band.

One example of the prior art wavelength selecting devices will now be specifically discussed.

FIG. 11 pertains to the structure of the prior art wavelength selecting device, wherein FIGS. 11(a) and 11(b) depict top plan and side views thereof, respectively. In FIG. 11, reference numeral 41 represents an input optical fiber; reference numeral 42 represents a light receiving optical fiber; reference numeral 43 represents a lens; reference numeral 44 represents a diffraction grating; reference numeral 45 represents a rotary mechanism; and reference numeral 46 represents an end face of each of the optical fibers 41 and 42.

The wavelength selecting device operates in the following manner. For the purpose of discussion, the wavelengths are respectively designated by $\lambda a$, $\lambda b$ and $\lambda c$ in the order from the shortest wavelength.

Wavelength multiplexed beams having the respective wavelengths $\lambda a$, $\lambda b$ and $\lambda c$ emitted from the input optical fiber 41 are incident on the diffraction grating 44 through the lens 43 and are subsequently diffracted by the diffraction grating 44. Some of the diffracted beams falling in a desired wavelength region are converged by the lens 43 so as to enter the light receiving optical fiber 42, thereby accomplishing a wavelength selection. Specifically, when the diffraction grating 44 while receiving the wavelength multiplexed beams is rotated by the rotary mechanism 45, the beams of respective wavelengths $\lambda a$, $\lambda b$ and $\lambda c$ can be directed into the light receiving optical fiber 42.

In the construction described above, however, the end face 46 of each of the optical fibers 41 and 42 is ground so as to lie perpendicular to the optical axis of the respective optical fiber 41 or 42 and, therefore, the reflected light tends to be multiply reflected between the two end faces of the input and light receiving optical fibers 41 and 42 and, hence, between a transmitter side and a receiver side, causing a Fabry-Perot resonance. The occurrence of the Fabry-Perot resonance of light tends to adversely affect the quality of transmitted signals particularly in the case of analog transmission.

Also, since the input optical fiber 41 and the light receiving optical fiber 42 are arranged in the same direction as the direction of diffraction of the rays of light from the diffraction grating 44, and if the wavelength multiplexed beams contain a light component of a wavelength whose angle of diffraction matches the direction of the input optical fiber, the light of such wavelength tends to be coupled to the input optical fiber, bringing about an adverse influence on a transmitter as a back-reflected light. This problem is inherent in, for example, the device disclosed in U.S. Pat. No. 4,763,969.

SUMMARY OF THE INVENTION

Objects of the present invention are to provide an improved optical fiber array, and a method of making the same, wherein the interval or pitch at which a plurality of optical fibers are laid down in a linear array is minimized to a value comparable to the outer diameter of each optical fiber, which does not require the use of a highly sophisticated machining or grinding technique when arranging the optical fibers relative to each other while allowing the optical fibers to be highly accurately positioned relative to each other, and wherein any possible adverse influence which may be brought about by rays of light reflected from end faces of the optical fibers is minimized.

To this end, an optical fiber array according to the present invention comprises a pair of blocks having respective recesses which, when the blocks are combined together, cooperate together to define a cavity, and a plurality of optical fibers having respective end portions accommodated within the cavity in a linear array. Neighboring end faces of the blocks adjacent end faces of the optical fibers are ground slantwise relative to a common plane in which the linear array of the end portions of the optical fibers lie and also relative to an optical axis of each of the optical fibers.

According to one aspect of a method of making the optical fiber array of the present invention, the optical fiber array of the type referred to above can be manufactured by preparing first and second blocks each having a generally L-shaped recess defined therein and delimited by a step and a flat wall surface perpendicular to the step, in said respective first and second blocks defining the cavity when said first and second blocks are combined together; placing end portions of the optical fibers on the flat wall surface of the first block in a linear array so as to dispose the linear array of the end portions of the optical fibers in the recess of the first block; placing the second block over said one of the blocks with the inclined end faces of said first and second blocks lying in a common plane and with the steps in the first and second blocks situated on respective sides of the linear array of end portions of the optical fibers; moving one of the first and second blocks relative to the other of the first and second blocks in a direction by which the steps of said first and second blocks are brought towards each other so as to confine the linear array of the end portions of the optical fiber within the cavity while the end portions of the optical fibers are brought into a closely juxtaposed relationship with each other; and grinding respective end faces of the optical fibers together with the end faces of the first and second blocks so as to also be inclined.

According to another aspect of the method of making the optical fiber array of the present invention, a viscous liquid medium may be applied to the end portions of the optical fibers after the placement of the end portions of the optical fibers on the flat wall surface of the first block.

Also, regardless of whether the viscous liquid medium is employed, the first and second blocks placed one above the other with the optical fibers accommodated loosely within the cavity may be sandwiched between magnets or between an electromagnet and a metal member to retain the first and second blocks in position relative to each other prior to one of the first and second blocks being moved relative to the other of the first and second blocks.

The viscous liquid medium may be a UV-curable resin that can be cured upon being irradiated with UV rays of light.

The present invention also provides a wavelength selecting device utilizing the optical fiber array of the structure referred to above in which no harmful rays of light reflected backwards will enter an input optical fiber. This wavelength selecting device comprises a diffraction grating, a lens, and the optical fiber array including an input optical fiber and a light receiving optical fiber, respective end faces of the input and light receiving optical fibers being inclined in the same direction and disposed in a linear array in a direction parallel to the direction in which the grating grooves extend in the diffraction grating so as to lie parallel to each other.

Preferably, the diffraction grating may be a Fourier diffraction grating capable of exhibiting a high efficiency of diffraction and having a minimized dependency on polarized light, an example of which is disclosed in Appl. Opt. 31, No. 16, pp. 3015-3019 (1992).

According to the present invention, since the respective end faces of the optical fibers are ground to be inclined in the same direction, rays of light reflected from the end faces of the optical fibers are reflected at an angle effective to avoid any possible re-entry thereof into the original optical system. Also, if the input and light receiving optical fibers forming parts of the wavelength selecting device are positioned at respective locations different from the direction in which the rays of light are diffracted by the diffraction grating, no light of unwanted wavelength will enter the input optical fiber.

BRIEF DESCRIPTION OF THE DRAWINGS

These and other objects and features of the present invention will become clear from the following description taken in conjunction with preferred embodiments thereof with reference to the accompanying drawings, in which like parts are designated by like reference numerals and in which.

DETAILED DESCRIPTION OF THE PREFERRED EMBODIMENTS

Figure 1:
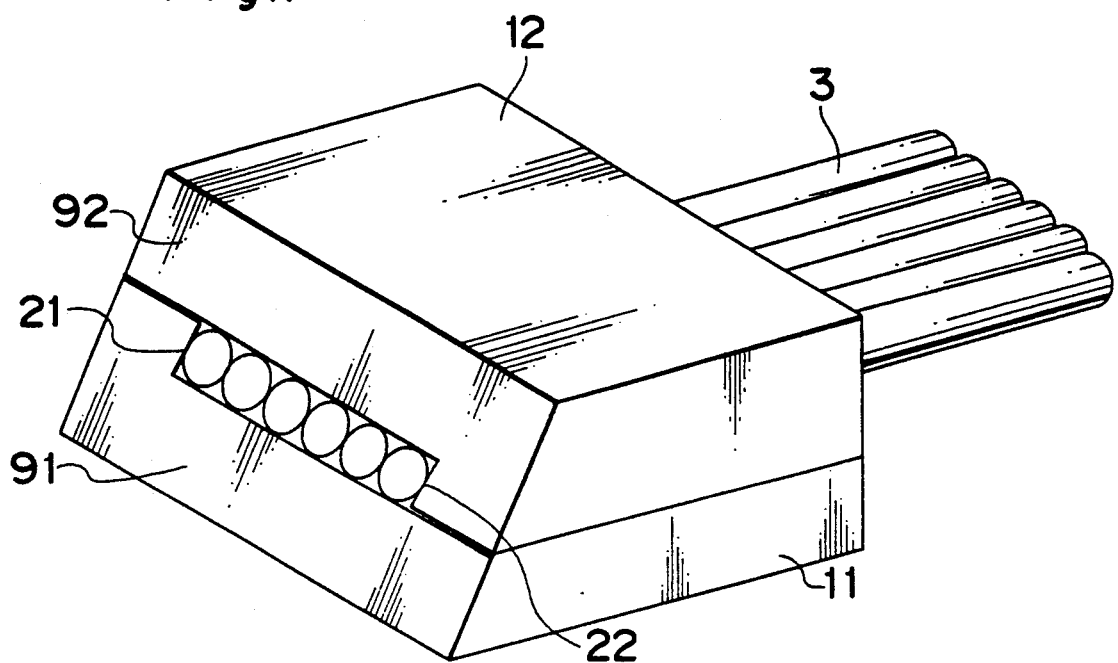
FIG. 1 is a schematic perspective view of an optical fiber array.
Figure 2:
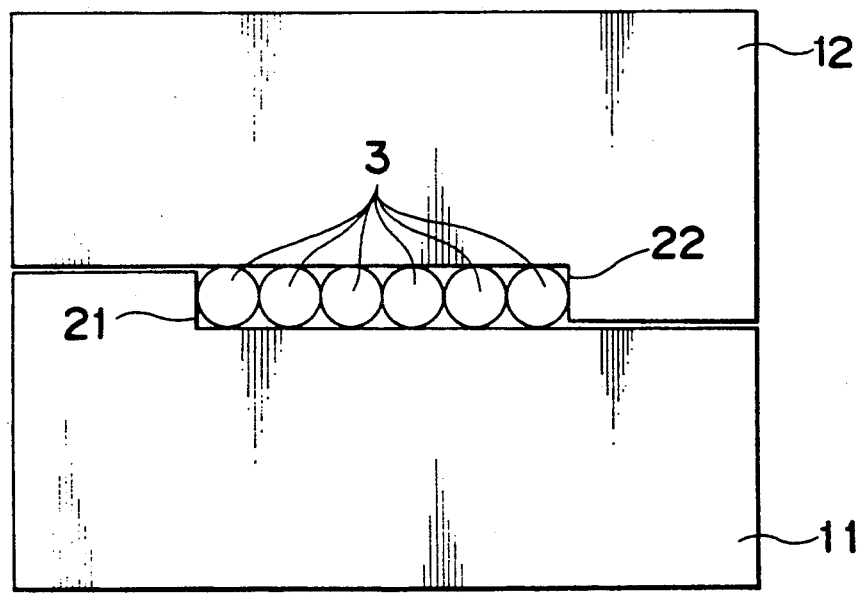
FIG. 2 is a schematic front elevational view of the optical fiber array shown in FIG. 1.

FIG. 1 is a schematic perspective view of one preferred embodiment of an optical fiber array according to the present invention and FIG. 2 is a schematic front elevational view of the optical fiber array. Referring to FIGS. 1 and 2, reference numerals 11 and 12 represent lower and upper blocks, respectively; reference numerals 21 and 22 represent steps defined in the respective blocks 11 and 12; reference numeral 3 represents a plurality of optical fibers; and reference numerals 91 and 92 represents end faces of the respective blocks 11 and 12 adjacent where respective end faces of the optical fibers 3 are situated. As shown in FIG. 2, the optical fibers 3 are fixedly arranged in a linear array with their end portions closely juxtaposed and firmly received between flat upper and lower wall surfaces of the blocks 11 and 12 and also between the steps 21 and 22 of the blocks 11 and 12.

The respective end faces 91 and 92 of the blocks 11 and 12 adjacent end faces of the optical fibers 3 are, as best shown in FIG. 1, ground from above so as to be inclined relative to the optical axes of the optical fibers 3 so that a common plane in which the end faces 91 and 92 lie is inclined relative to the optical axes of the optical fibers 3, but parallel to the direction in which the optical fibers 3 are held in a closely neighboring relationship with each other. Therefore, respective end faces of the optical fibers 3 are correspondingly ground and lie flush with the common plane in which the end faces 91 and 92 of the blocks 11 and 12 lie.

It will readily be understood that the end faces of the respective optical fibers 3 are ground at an equal angle of inclination and, therefore, the resultant linear array of the optical fibers 3 is effective to avoid any possible adverse influence which would otherwise brought about on an optical element with which the optical fiber array is coupled.

According to the present invention, the above-described optical fiber array can be fabricated by means of various methods which will now be described.

Figure 3:
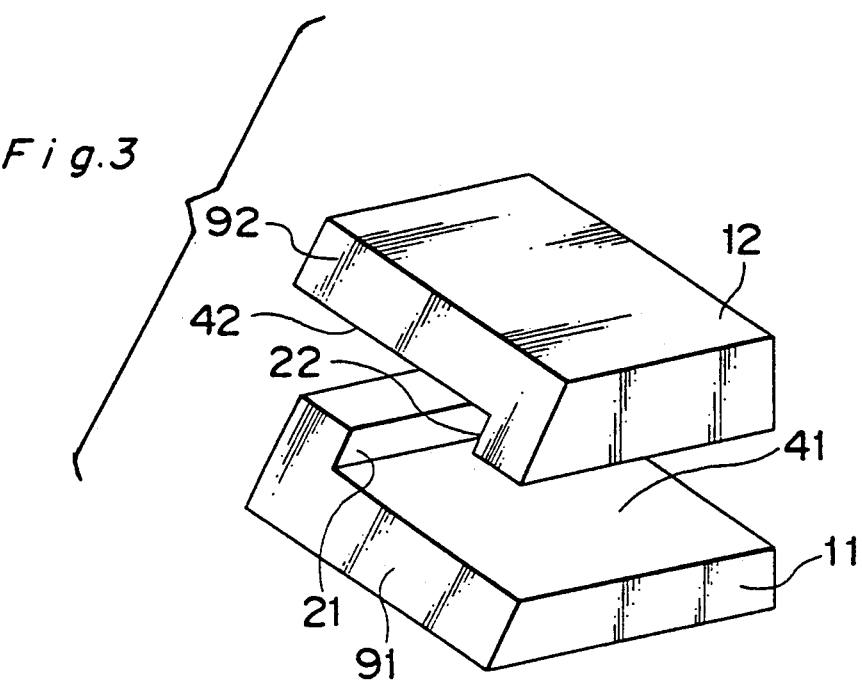
FIG. 3 is a schematic perspective view of a block assembly used in making the optical fiber array.
Figure 4A:
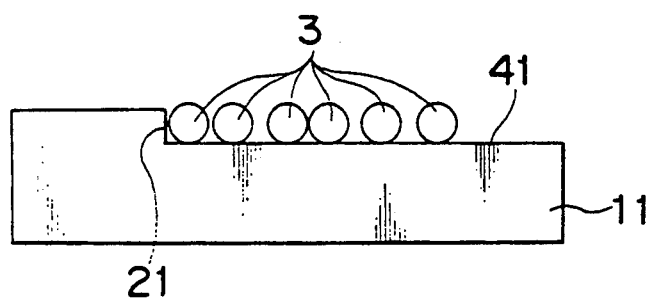
FIGS. 4(a) to 7(d) are schematic diagrams showing the sequence of making the optical fiber array according to first to fourth preferred embodiments of the present invention.
Figure 4B:
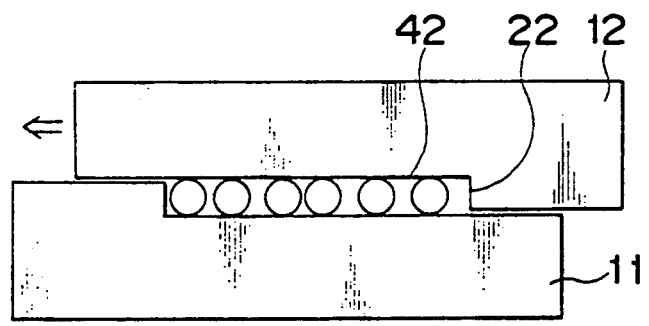
Figure 4C:
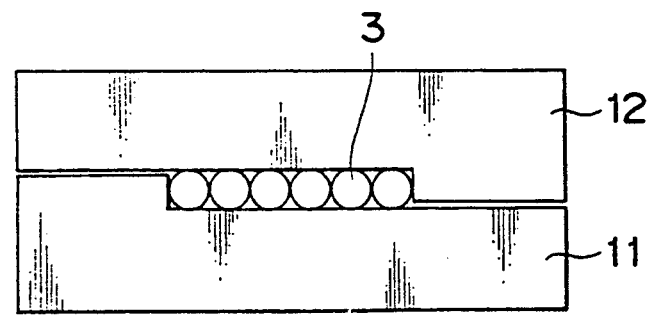

FIG. 3 illustrates, in a schematic perspective view, a block assembly comprising the upper and lower blocks 11 and 12 and FIGS. 4(a) to 4(c) illustrate the sequence of making the optical fiber array according to a first preferred embodiment of the present invention. In FIGS. 3 and 4, reference numerals 11 and 12 represent lower and upper blocks, respectively; reference numerals 21 and 22 represent steps defined in the respective blocks 11 and 12; reference numeral 3 represents a plurality of optical fibers; reference numerals 41 and 42 represent flat wall surfaces of the respective blocks 11 and 12 which cooperate with the associated steps 21 and 22 to define generally L-shaped recesses, respectively; and reference numerals 91 and 92 represent end faces of the respective blocks 11 and 12 adjacent where respective end faces of the optical fibers 3 are situated.

Referring first to FIG. 4(a), the plural optical fibers 3 are positioned relative to the block assembly with their end portions placed on the flat wall surface 41 of the lower block 11. Each of the lower and upper blocks 41 and 42 has an inclined end face 91 and 92 as shown in FIG. 3, and, when the end portions of the respective optical fibers 3 are placed on the flat wall surface 41 of the lower block 11, they need not be brought into contact with each other.

Thereafter, the upper block 12 having a structure similar to that of the lower block 11, i.e. a recess delimited by the step 22 and the flat wall surface 42, is placed over the lower block 11 as shown in FIG. 4(b) with a linear array of the end portions of the optical fibers 3 confined within a cavity defined by the recesses in the lower and upper blocks 11 and 12. As clearly shown in FIG. 4(b), the placement of the upper block 12 over the lower block 11 is carried out such that the steps 21 and 22 in the lower and upper blocks 11 and 12 occupy positions on respective sides of the linear array of the end portions of the optical fibers 3 while the flat wall surfaces 41 and 42 thereof contact the individual end portions of the optical fibers 3 to sandwich the linear array thereof. If the height of each step 21 and 22 is chosen to be smaller than the outer diameter of each of the optical fibers 3, the flat wall surface 41 and 42 of each lower and upper block 11 and 12 are always held in contact with the optical fibers 3 upon placement of the upper block 12 over the lower block 11.

After the placement of the upper block 12 over the lower block 11 as shown in FIG. 4(b), one of the lower and upper blocks, for example, the upper block 12 is moved parallel relative to the lower block 11 in a direction transverse to the optical axes of the optical fibers 3 as shown by the arrow in FIG. 4(b) to bring the step 22 towards the step 21 and hence to bring the end portions of the optical fibers 3 into a closely neighboring relationship with each other as shown in FIG. 4(c). In this condition of FIG. 4(c), neighboring end portions of the optical fibers 3 are held in contact with each other while the outermost end portions are also held in contact with the respective steps 21 and 22 in the lower and upper blocks 11 and 12.

The lateral movement of the upper block 12 relative to the lower block 11 is terminated when the end portions of the optical fibers 3 are brought into the closely neighboring relationship as shown in FIG. 4(c), and the lower and upper blocks 11 and 12 are then fixed together with the linear array of the optical fibers firmly clamped therebetween. After this fixing, the respective end faces 91 and 92 of the lower and upper blocks 11 and 12 where respective end faces of the optical fibers 3 are situated are ground at an inclination thereby completing the optical fiber array as shown in FIG. 1.

According to the foregoing method of the present invention, since the plural optical fibers are positioned between the two blocks each having a recess defined therein and are then brought into a closely neighboring relationship with each other by a lateral movement of one of the blocks relative to the other, the end faces of the optical fibers can be uniformly ground until inclined while in a linearly juxtaposed relationship with each other by means of a simple technique. Moreover, each of the blocks having the respective recesses defined therein can readily and easily be manufactured with no substantially complicated procedure required.

Figure 5A:
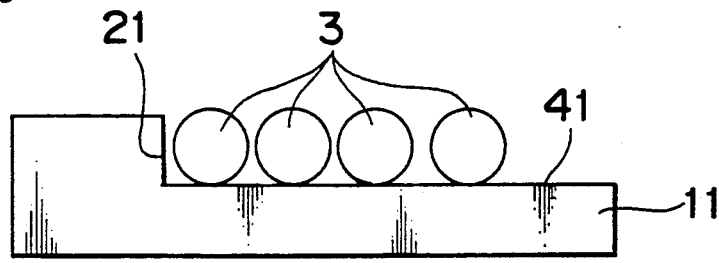
Figure 5B:
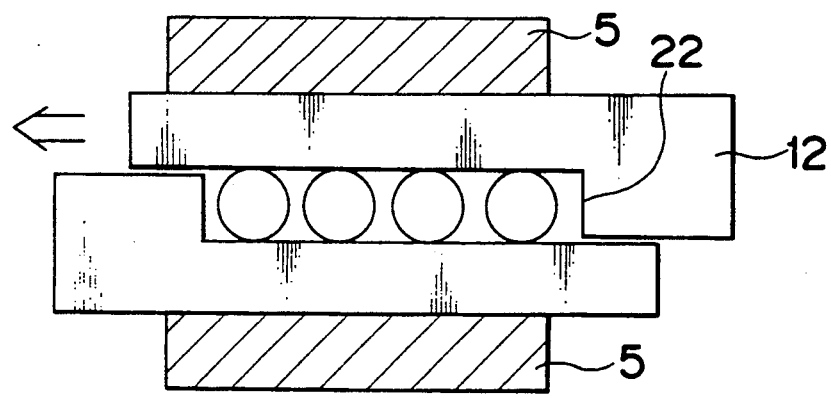

Reference will now be made to FIG. 5 showing a second preferred embodiment of the method according to the present invention. In the practice of this method, two magnets 5 are employed. While the method shown in FIG. 5 is similar to that according to the foregoing embodiment of the present invention, after the placement of the end portions of the optical fibers 3 over the lower block 11 as shown in FIG. 5(a) followed by the placement of the upper block 12 over the lower block 11 substantially as shown in FIG. 5(b), the lower and upper blocks 11 and 12 are temporarily retained in position sandwiching a loose array of those end portions of the optical fibers 3 by means of the magnets 5 then exerting magnetic forces of attraction that act to draw the lower and upper blocks 11 and 12 close towards each other as shown in FIG. 5(b).

Figure 5C:
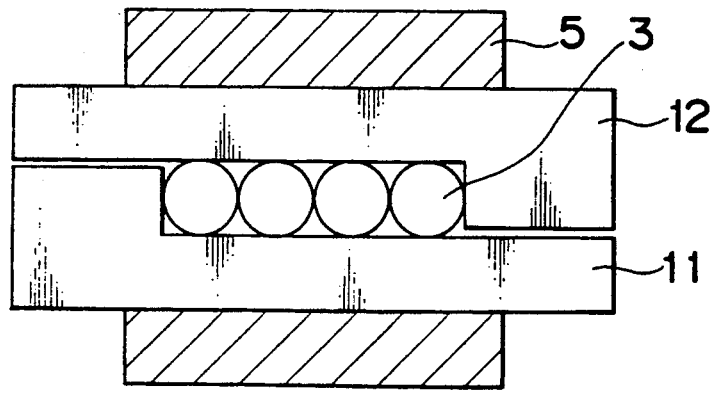

After the condition of FIG. 5(b), the upper block 12 is moved relative to the lower block 11 in a manner similar to that effected in the practice of the foregoing embodiment of the present invention until the end portions of the optical fibers 3 are brought into the closely neighboring relationship as shown in FIG. 5(c), and the lower and upper blocks 11 and 12 are then fixed together with the linear array of the optical fibers firmly clamped therebetween. After this fixing, the respective end faces 91 and 92 of the lower and upper blocks 11 and 22 where respective end faces of the optical fibers 3 are situated are ground until skewed thereby completing the optical fiber array.

According to the second embodiment of the present invention, the plural optical fibers are positioned between the two blocks each having a recess defined therein and are then brought into a closely neighboring relationship with each other by a lateral movement of one of the blocks relative to the other while the blocks are sandwiched between the magnets. Therefore, the end faces of the optical fibers can be uniformly ground until inclined while in a linearly juxtaposed relationship with each other by means of a simplified technique. Moreover, each of the blocks having the respective recesses defined therein can readily and easily be manufactured with no substantially complicated procedure required.

FIG. 6 illustrates a third preferred embodiment of the method according to the present invention. This method differs from the second embodiment of the present invention in that, in the practice of the method shown in FIG. 5, a viscous liquid medium 6 is employed.

Figure 6A:
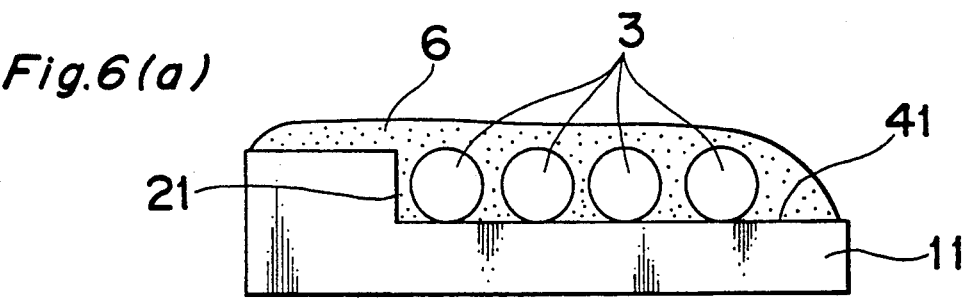

As shown in FIG. 6(a), the plural optical fibers 3 are positioned relative to the block assembly with their end portions placed on the flat wall surface 41 of the lower block 11. When the end portions of the respective optical fibers 3 are placed on the flat wall surface 41 of the lower block 11, they need not be brought into contact with each other. Thereafter, the viscous liquid medium 6 is applied over those end portions of the optical fibers 3 resting on the flat wall surface 41 of the lower block 11.

Figure 6B:
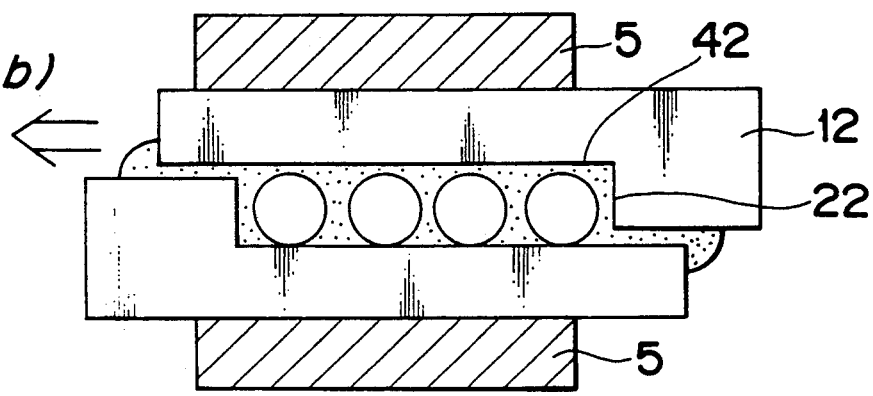

The upper block 12 similar the lower block 11 is then placed over the lower block 11 as shown in FIG. 6(b) with a linear array of the end portions of the optical fibers 3 confined within a cavity defined by the recesses in the lower and upper blocks 11 and 12. The placement of the upper block 12 over the lower block 11 is carried out such that the steps 21 and 22 in the lower and upper blocks 11 and 12 occupy positions on respective sides of the linear array of the end portions of the optical fibers 3 while the flat wall surfaces 41 and 42 thereof contact the individual end portions of the optical fibers 3 to sandwich the linear array thereof. At this time, due to the viscosity of the liquid medium 6, the upper block 12 so placed is spaced from the end portions of the optical fibers 3 and also from the lower block 11. The placement of the upper block 12 over the lower block 11 is followed by a placement of the magnets 5 with the blocks 11 and 12 positioned therebetween as shown in FIG. 6(b).

Figure 6C:
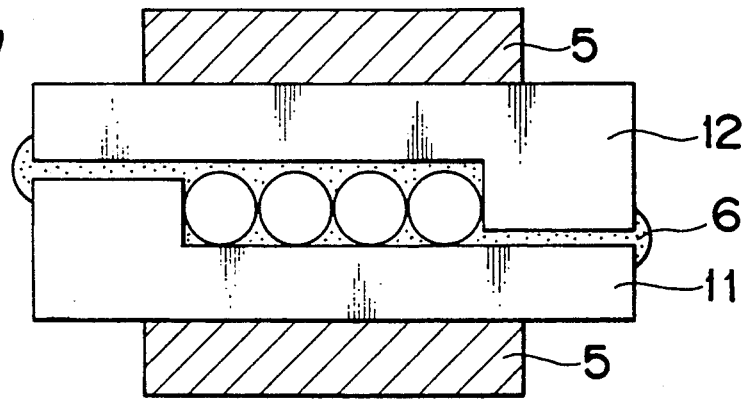

After the placement of the magnets 5, the upper block 12 is moved parallel relative to the lower block 11 in a direction transverse to the optical axes of the optical fibers 3 as shown by the arrow in FIG. 6(b) to bring the step 22 towards the step 21 and hence to bring the end portions of the optical fibers 3 into a closely neighboring relationship with each other as shown in FIG. 6(c). The lateral movement of the upper block 12 relative to the lower block 11 is terminated when that end portions of the optical fibers 3 are brought into the closely neighboring relationship. In this condition of FIG. 6(c), neighboring end portions of the optical fibers 3 are held in contact with each other while the outermost end portions are also held in contact with the respective steps 21 and 22 in the lower and upper blocks 11 and 12.

Figure 6D:
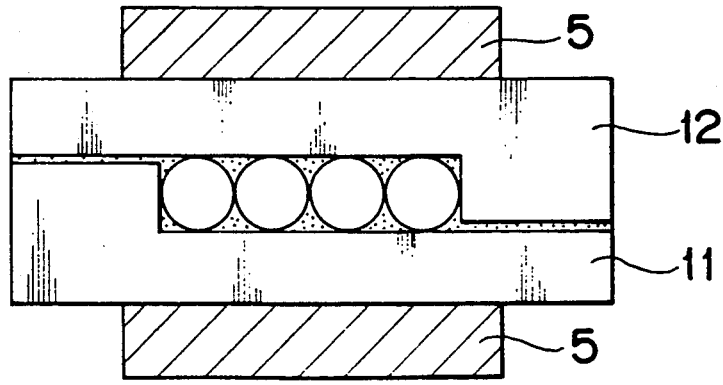

Once the condition as shown in FIG. 6(c) has been established, the viscous liquid medium 6 filling the gap between the lower and upper blocks 11 and 12 is partially squeezed outwardly from lateral faces of the blocks 11 and 12 by a compressive force developed as a result of the magnetic forces of attraction acting between the magnets 5, thereby confining the end portions of the optical fibers within the cavity between the blocks 11 and 12 in a linear array as shown in FIG. 6(d).

After the fixing, the respective end faces 91 and 92 of the lower and upper blocks 11 and 22 where respective end faces of the optical fibers 3 are situated are ground at an inclination thereby completing the optical fiber array.

According to the third embodiment of the present invention, the use of the viscous liquid medium 6 is effective to disperse stresses which are produced by the blocks 11 and 12 on the end portions of the optical fibers during the arrangement thereof in a linear array, making it possible to provide the optical fiber array at a high yield.

The fourth preferred embodiment of the method of making the optical fiber array according to the present invention is shown in FIG. 7. The method shown in FIG. 7 is generally similar to a combination of the second and third embodiments of the present invention, except that in place of the magnets 5 used in the practice of the third embodiment of the present invention a combination of an electromagnet 51 and a metal block 8 made of, for example, iron is employed.

Figure 7A:
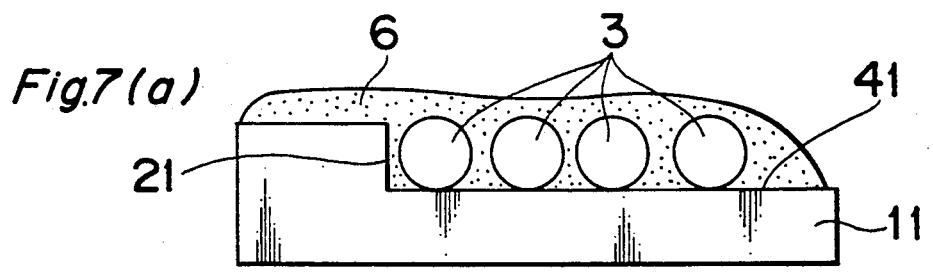
Figure 7B:
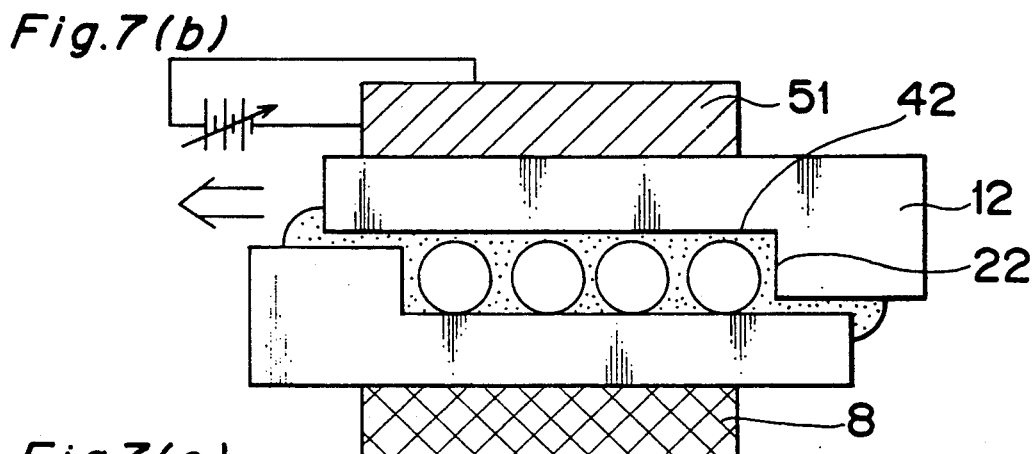

Specifically, as shown in FIG. 7(a), the plural optical fibers 3 are positioned relative to the block assembly with their end portions placed on the flat wall surface 41 of the lower block 11. When the end portions of the respective optical fibers 3 are placed on the flat wall surface 41 of the lower block 11, they need not be brought into contact with each other. Thereafter, the viscous liquid medium 6 is applied over those end portions of the optical fibers 3 resting on the flat wall surface 41 of the lower block 11. The upper block 12 is then placed over the lower block 11 as shown in FIG. 7(b) with a linear array of the end portions of the optical fibers 3 confined within a cavity defined by the recesses in the lower and upper blocks 11 and 12. The placement of the upper block 12 over the lower block 11 is carried out such that the steps 21 and 22 in the lower and upper blocks 11 and 12 occupy positions on respective sides of the linear array of the end portions of the optical fibers 3 while the flat wall surfaces 41 and 42 thereof contact the individual end portions of the optical fibers 3 to sandwich the linear array thereof. At this time, due to the viscosity of the liquid medium 6, the upper block 12 so placed is spaced from the end portions of the optical fibers 3 and also from the lower block 11. The placement of the upper block 12 over the lower block 11 is followed by a placement of the electromagnet 51 and the metal block 8 with the blocks 11 and 12 positioned therebetween as shown in FIG. 7(b).

Figure 7C:
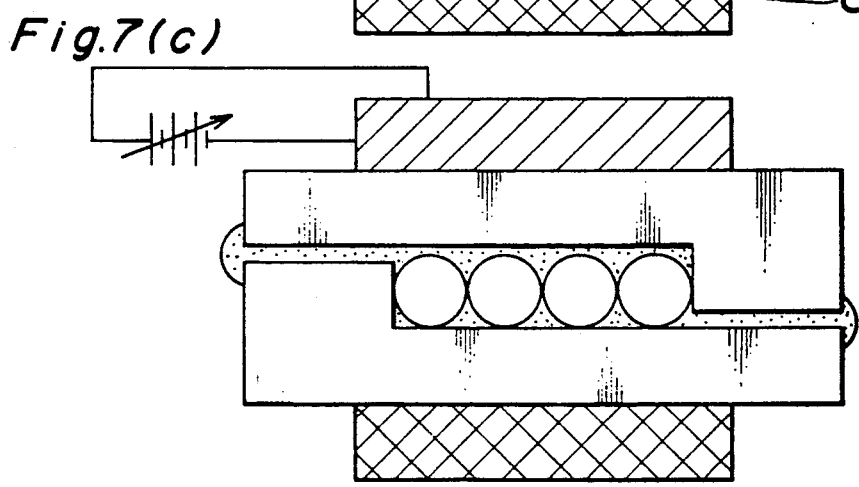

After the placement of the electromagnet 5 and the metal block 8, the upper block 12 is moved parallel relative to the lower block 11 in a direction transverse to the optical axes of the optical fibers 3 as shown by the arrow in FIG. 7(b) to bring the step 22 towards the step 21 and hence, to bring the end portions of the optical fibers 3 into a closely neighboring relationship with each other as shown in FIG. 7(c). The lateral movement of the upper block 12 relative to the lower block 11 is terminated when the end portions of the optical fibers 3 are brought into the closely neighboring relationship. In this condition of FIG. 7(c), neighboring end portions of the optical fibers 3 are held in contact with each other while the outermost end portions are also held in contact with the respective steps 21 and 22 in the lower and upper blocks 11 and 12.

Figure 7D:
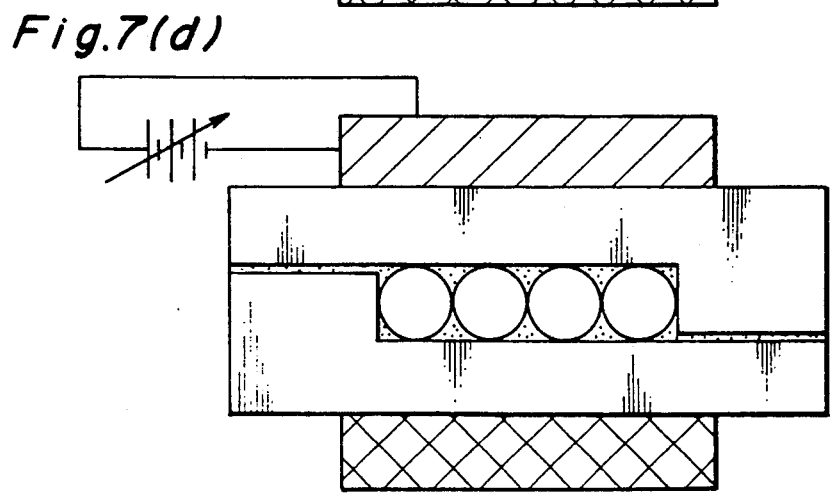
Figure 8A:
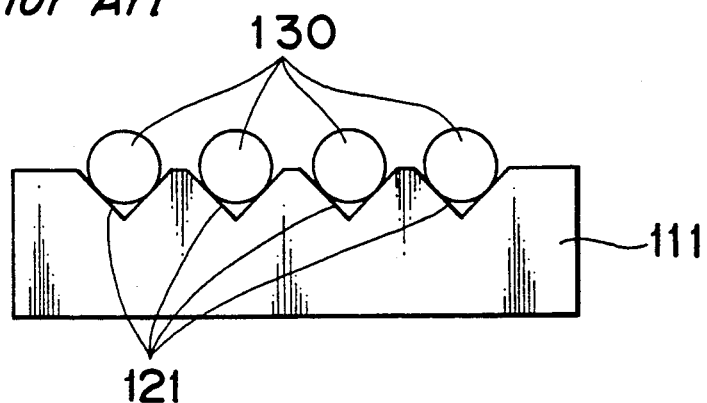
FIGS. 8(a) and 8(b) are schematic diagram showing the sequence of making the prior art optical fiber array.
Figure 8B:
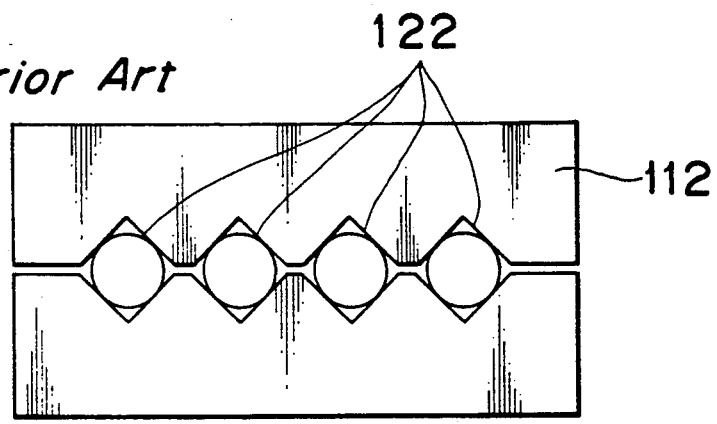
Figure 9:
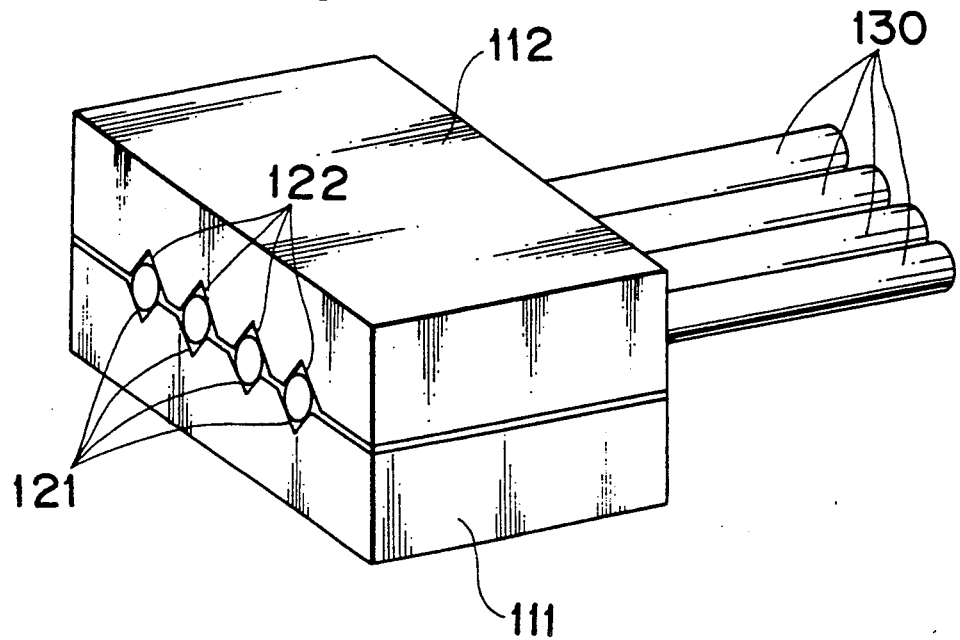
FIG. 9 is a schematic perspective view of the prior art optical fiber array.

Once the condition as shown in FIG. 7(c) has been established, a progressively increasing electric voltage is applied from an electric power source 7 to the electromagnet 51 to cause the latter to exert a magnetic force of attraction acting to draw the metal block 8 towards the electromagnet 51 thereby compressing the blocks 11 and 12 together so that the viscous liquid medium 6 filling the gap between the lower and upper blocks 11 and 12 is partially squeezed outwardly from lateral faces of the blocks 11 and 12. In this way, the end portions of the optical fibers are confined within the cavity between the blocks 11 and 12 in a linear array as shown in FIG. 7(d).

After the fixing, the respective end faces 91 and 92 of the lower and upper blocks 11 and 22 where respective end faces of the optical fibers 3 are situated are ground at an inclination thereby completing the optical fiber array.

According to the fourth embodiment of the present invention, the use of the electromagnet 51 is effective to speed the squeezing of the viscous liquid medium 6, which results in the shortening of manufacturing time.

According to the fourth embodiment of the present invention, the use of the viscous liquid medium 6 is effective to disperse stresses which are produced by the blocks 11 and 12 on the end portions of the optical fibers during the arrangement thereof in a linear array, and those end portions of the optical fibers confined within the cavity are favorably closely juxtaposed with each other.

It is to be noted that if in the practice of any one of the third and fourth embodiments of the present invention the viscous liquid medium 6 is employed in the form of a UV-curable resin, the assembly shown in FIG. 6(d) or FIG. 7(d) should be exposed to UV radiation to fix the linear array of the optical fibers. In this case, one or both of the lower and upper blocks must be made of material transparent to the UV rays of light.

Also, if each of the lower and upper blocks 11 and 12 is made of material having a hardness equal to that of the optical fibers employed, for example, glass, the block assembly consisting of the lower and upper blocks can easily be ground and the end faces of the optical fibers retained by the block assembly can readily be ground simultaneously to a desired finish.

As hereinbefore described, by grinding the end faces of the optical fibers, arranged in a linear array between the blocks having the respective recesses each delimited by the step and the flat wall surface, along the inclined end faces of the respective blocks, the end faces of the optical fibers can be uniformly ground at an angle of inclination conforming to the angle of inclination of a common plane in which the end faces of the respective blocks lie. In the resultant optical fiber array, the end portions of the optical fibers are very closely juxtaposed with each other, arranged in a linear array and positioned accurately. Also, the use of the viscous liquid medium is effective to disperse the stresses, to avoid any possible breakage of some of the optical fibers during the arrangement and to provide the resultant optical fiber array at a high yield. When the UV-curable resin is employed for the viscous liquid medium, the optical fibers can readily and easily be fixed in position relative to each other.

An embodiment of the wavelength selecting device utilizing the optical fiber array of the structure discussed hereinbefore will now be described.

Figure 10A:
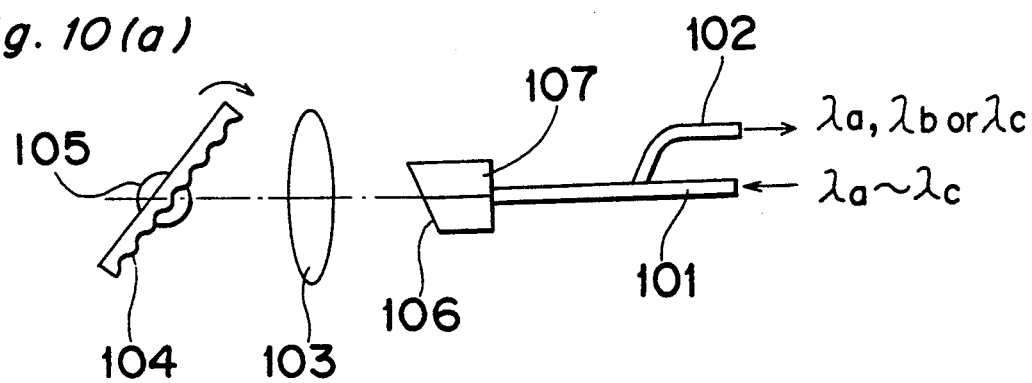
FIGS. 10(a) and 10(b) are schematic plan and side views of a wavelength selecting device.
Figure 10B:
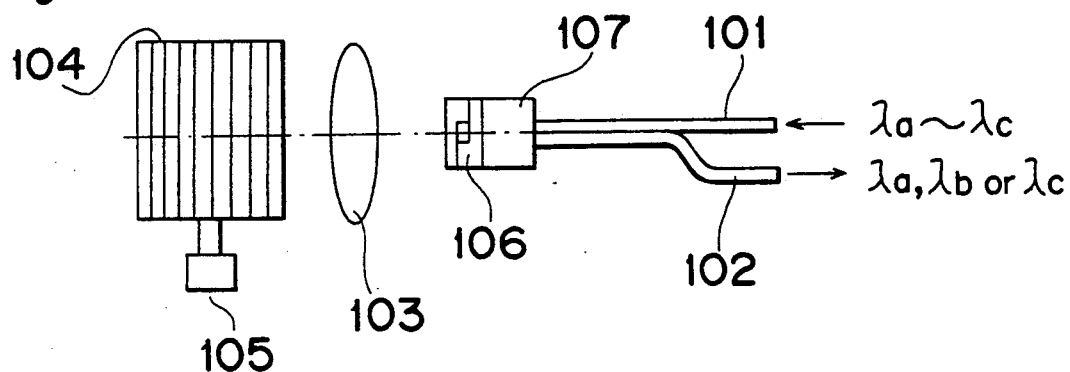

FIG. 10 illustrates the structure of the wavelength selecting device, wherein FIGS. 10(a) and 10(b) are top plan and side views, respectively. Referring now to FIG. 10, reference numeral 101 represents an input fiber; reference numeral 102 represents a light receiving fiber; reference numeral 103 represents a lens; reference numeral 104 represents a diffraction grating; reference numeral 105 represents a rotary mechanism; reference numeral 106 represents an end face where end faces of the optical fibers are situated; and reference numeral 107 represents an optical fiber array in which the input and light receiving fibers 101 and 102 are arranged. For the purpose of discussion, the wavelengths are respectively designated by λa, λb and λc in the order from the shortest wavelength.

The wavelength selecting device operates in the following manner.

Wavelength multiplexed beams having the respective wavelengths λa, λb and λc emitted from the input optical fiber 101 are incident on the diffraction grating 104 through the lens 103 and are subsequently diffracted by the diffraction grating 104 at different angles. The diffraction grating 104 is rotated by the rotary mechanism 106 about an axis of rotation parallel to grating grooves in the diffraction grating 104 so as to assume such an angle that, for example, the wavelength λi can be coupled with the light receiving fiber 102 through the lens 103. If the preset angle as viewed in a direction conforming to the normal of the diffraction grating 104 is $\theta i$ and the interval between each of neighboring grating grooves in the diffraction grating 104 is d, the preset angle $\theta i$ can be expressed by the following equation:

$$\theta i = \sin^{-1}(\lambda i / 2d) \quad \{i = a, b, c\} \tag{1}$$

and in such construction, $\theta a < \theta b < \theta c$. Each of the input and light receiving optical fibers 101 and 103 has an end face 106 inclined in the same direction and is laid down with its lengthwise direction inclined relative to the axis of beam at an angle dependent on the angle of inclination of the respective end face of each optical fiber. If the angle of inclination of the optical fibers relative to an optical axis is expressed by $\delta$, the index of refraction of the optical fiber is expressed by $n_g$ and the angle of inclination of the end face relative to the normal of the optical axis of each of the optical fibers is expressed by $\phi$, the following equation can be obtained.

$$\delta = \sin^{-1}(n_g \sin \phi) - \phi \quad (2)$$

In order for the optical fibers 101 and 102 to have their end faces 106 ground in the same inclined direction, the optical fiber array 107 including block surface 106 has been ground to be inclined while the optical fibers 101 and 102 are sandwiched as shown in FIG. 10(a), should be employed. With this construction, by fixing the optical fiber array 107 to a jig that will establish the angle $\delta$ of inclination relative to the optical axis of the optical fiber, the optical fibers 101 and 102 can be disposed at the same angle $\delta$ of inclination.

As hereinabove described, according to the present invention, the rays of light returning from an optical system back to the end faces of the input and light receiving optical fibers can be reflected at an angle that satisfies the following equation and can therefore be prevented from returning to the optical system:

$$\phi = 2(\delta + \phi) \quad (3)$$

wherein $\phi$ represents the angle of reflection of the rays of light relative to the optical axis.

Preferably, the angle $\phi$ at which the end face of each of the optical fibers is ground at an inclination is generally within the range of 7 to 9 degrees. Accordingly, the angle $\delta$ of inclination is within the range of 3.5 to 4 degrees.

Figure 11A:
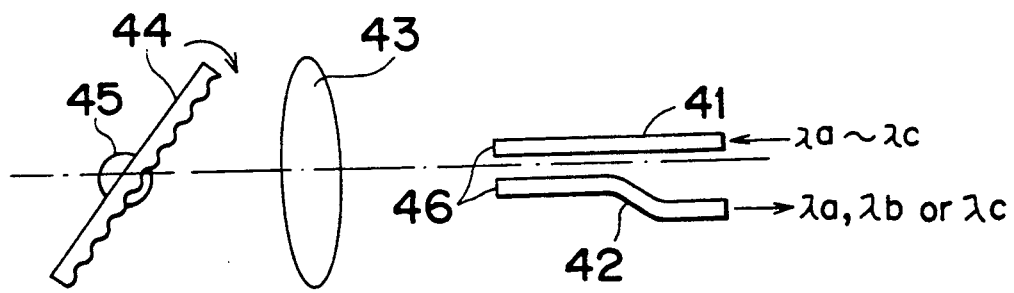
FIGS. 11(a) and 11(b) are schematic plan and side views of the prior art wavelength selecting device.
Figure 11B:
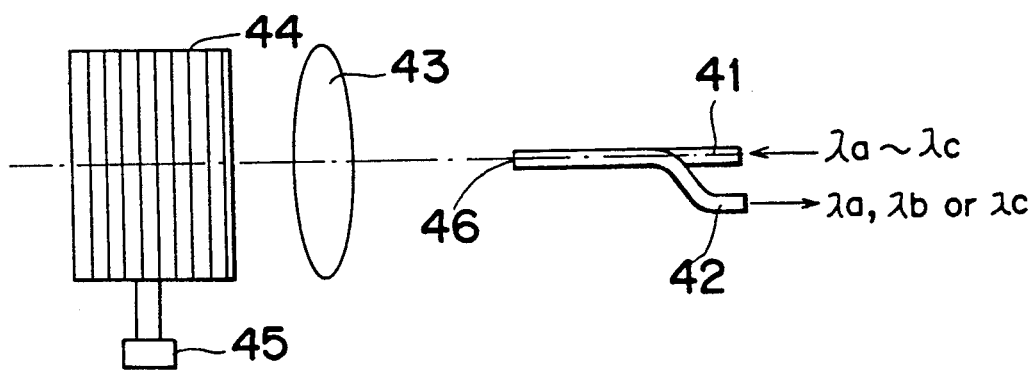

The input and light receiving optical fibers 101 and 102 are arranged in the same direction as that of the grating grooves in the diffraction grating 104 as shown in FIGS. 10(a) and 10(b). Thus, the wavelength multiplexed beams emerging from the input optical fiber 101 can be dispersed along a linear line perpendicular to the direction of the grating grooves and intersecting the light receiving optical fiber 102 and, therefore, an optical system can be realized in which no dispersed rays of light return to the input optical fiber 101. This can be accomplished by arranging the optical fiber array 107 in a manner as shown in FIG. 11(b).

It is to be noted that, while in the illustrated embodiment the optical fibers 101 and 102 have been described as arranged in the same direction as that of the grating grooves, any relative positioning may be employed provided that no rays of light dispersed from the diffraction grating 104 will return to the input optical fiber 101.

Although reference has been made to the use of the diffraction grating, if a Fourier diffraction grating which is generally known as a high efficient diffraction grating having a minimized dependency on polarized light is employed, the proportion of the diffracted rays of light, that is, the efficiency of diffraction, amounts to 90% or higher and, therefore the intensity of light coupled with the light receiving optical fiber can be enhanced. Furthermore, since the inclined end faces lie in the same direction, the input and light receiving optical fibers can be retained in the same direction and can therefore good reproductivity can be attained.

As hereinbefore discussed, since according to the present invention the respective end faces of the input optical fiber and the light receiving optical fibers are ground inclined in the same direction, no reflected light returns to the optical system and the relative positioning can readily be accomplished.

It is to be noted that the optical fiber array of the present invention can be utilized with no distinction made between the input and light receiving features and the present invention can be applicable to an optical system which requires a plurality of inputs and outputs from an optical device taking the shape of an array.

Although the present invention has been described in connection with the preferred embodiments thereof with reference to the accompanying drawings, it is to be noted that various changes and modifications will become apparent to those skilled in the art. Such changes and modifications are to be understood as included within the scope of the present invention as defined by the appended claims, unless they otherwise depart therefrom.

What is claimed is:

1. A method of making an optical fiber array which comprises the steps of:

preparing first and second blocks each having a generally L-shaped recess defined therein, each of said blocks having a step and a flat wall surface perpendicular to the step which delimit said recess, said recesses in said respective first and second blocks defining a cavity when said first and second blocks are placed together in a mating relation, neighboring end faces of said first and second blocks being oblique to said flat wall surfaces;

placing end portions of optical fibers on the flat wall surface of the first block in a linear array so as to dispose the linear array of the end portions of the optical fibers in the recess of the first block;

placing the second block over said first block with the inclined end faces of said first and second blocks lying in a common plane and with the steps of the first and second blocks situated on respective sides of the linear array of the end portions of the optical fibers;

moving one of the first and second blocks relative to the other of the first and second block in a direction which brings the steps of said first and second blocks towards each other so as to confine the linear array of the end portions of the optical fibers within the cavity while the end portions of the optical fibers are brought into a closely juxtaposed relationship with each other; and grinding the end faces of the optical fibers together with the end faces of the first and second blocks in such a manner that the end faces of the first and second blocks and the end faces of the optical fibers lie in a common plane inclined relative to a plane in which the linear array of the optical fibers lie and to an optical axis of each of the fibers.

2. A method of making the optical fiber array as claimed in claim 1, wherein the step of preparing comprises preparing each of said first and second blocks from a material having a hardness equal to that of the optical fibers.

3. A method of making an optical fiber array which comprises the steps of:

preparing first and second blocks each having a generally L-shaped recess defined therein, each of said blocks having a step and a flat wall surface perpendicular to the step which delimit said recess, said recesses in said respective first and second blocks defining a cavity when said first and second blocks are placed together in a mating relation, neighboring end faces of said first and second blocks being oblique to said flat wall surfaces;

placing end portions of optical fibers on the flat wall surface of the first block in a linear array so as to dispose the linear array of the end portions of the optical fibers in the recess of the first block;

placing the second block over said first block with the inclined end faces of said first and second blocks lying in a common plane and with the steps of the first and second blocks situated on respective sides of the linear array of the end portions of the optical fibers;

disposing first and second magnets on respective sides of an assembly of the first and second blocks so that the first and second blocks are retained in position by a magnetic force of attraction acting between the first and second magnets;

moving one of the first and second blocks relative to the other of the first and second block in a direction which brings the steps of said first and second blocks towards each other so as to confine the linear array of the end portions of the optical fibers within the cavity while the end portions of the optical fibers are brought into a closely juxtaposed relationship with each other; and grinding the end faces of the optical fibers together with the end faces of the first and second blocks in such a manner that the end faces of the first and second blocks and the end faces of the optical fibers lie in a common plane inclined relative to a plane in which the linear array of the optical fibers lie and to an optical axis of each of the fibers.

4. A method of making the optical fiber array as claimed in claim 3, wherein the step of preparing comprises preparing each of said first and second blocks from a material having a hardness equal to that of the optical fibers.

5. A method of making an optical fiber array which comprises the steps of:

preparing first and second blocks each having a generally L-shaped recess defined therein, each of said blocks having a step and a flat wall surface perpendicular to the step which delimit said recess, said recesses in said respective first and second blocks defining a cavity when said first and second blocks are placed together in a mating relation, neighboring end faces of said first and second blocks being oblique to said flat wall surfaces;

placing end portions of optical fibers on the flat wall surface of the first block in a linear array so as to dispose the linear array of the end portions of the optical fibers in the recess of the first block;

applying a viscous liquid medium into the recess of the first block and onto the end portions of the optical fibers accommodated therein;

placing the second block over said first block with the inclined end faces of said first and second blocks lying in a common plane and with the steps of the first and second blocks situated on respective sides of the linear array of the end portions of the optical fibers;

disposing first and second magnets on respective sides of an assembly of the first and second blocks so that the first and second blocks are retained in position by a magnetic force of attraction acting between the first and second magnets;

moving one of the first and second blocks relative to the other of the first and second block in a direction which brings the steps of said first and second blocks towards each other so as to confine the linear array of the end portions of the optical fibers within the cavity while the end portions of the optical fibers are brought into a closely juxtaposed relationship with each other; and grinding the end faces of the optical fibers together with the end faces of the first and second blocks in such a manner that the end faces of the first and second blocks and the end faces of the optical fibers lie in a common plane inclined relative to a plane in which the linear array of the optical fibers lie and to an optical axis of each of the fibers.

6. A method of making the optical fiber array as claimed in claim 5, wherein the step of disposed comprises disposing electromagnets on the respective sides of the assembly and applying an electric voltage to said electromagnets.

7. A method of making the optical fiber array as claimed in claim 5, wherein the step of applying said viscous liquid medium comprises applying a UV-curable resin and further comprising curing the UV-resin by radiating the linear array of the end portions of the optical fibers with UV-rays of light to thereby fix the linear array in position.

8. A method of making the optical fiber array as claimed in claim 5, wherein the step of preparing comprises preparing the first and second blocks from a material transparent to UV-rays of light.

9. The method of making the optical fiber array as claimed in claim 5, wherein the step of preparing comprises preparing each of said first and second blocks from a material having a hardness equal to that of the optical fibers.

* * * * *